(12) United States Patent
Woog

(10) Patent No.: US 9,272,907 B1
(45) Date of Patent: Mar. 1, 2016

(54) OZONE GENERATOR WITH A DISPOSABLE EMITTER CARTRIDGE

(71) Applicant: Gunter Woog, West Bend, WI (US)

(72) Inventor: Gunter Woog, West Bend, WI (US)

( * ) Notice: Subject to any disclaimer, the term of this patent is extended or adjusted under 35 U.S.C. 154(b) by 0 days.

(21) Appl. No.: 14/718,473

(22) Filed: May 21, 2015

Related U.S. Application Data

(60) Provisional application No. 62/016,961, filed on Jun. 25, 2014.

(51) Int. Cl.
*B01J 19/08* (2006.01)
*C01B 13/11* (2006.01)

(52) U.S. Cl.
CPC ........... *C01B 13/115* (2013.01); *C01B 2201/22* (2013.01)

(58) Field of Classification Search
CPC ...... C01B 13/115; C01B 2201/22; A61L 9/22
See application file for complete search history.

(56) References Cited

U.S. PATENT DOCUMENTS 5,538,695 A * 7/1996 Shinjo ................... C01B 13/11
422/186.07

* cited by examiner

*Primary Examiner* — Kishor Mayekar
(74) *Attorney, Agent, or Firm* — Donald J. Ersler

(57) ABSTRACT

An ozone generator with a disposable emitter cartridge preferably includes two emitter cartridges, a protective housing, a high voltage generation circuit and a power supply. The disposable emitter cartridge preferably includes an anode element, a cathode element and an insulating spacer. The anode element includes a plurality of emitter projections. The cathode element includes a base plate with a plurality of openings. The anode element is attached to one side of the insulating spacer and the cathode element is attached to an opposing side. The protective housing preferably includes a base portion, an emitter housing and a pair of vent caps. The two emitter cartridges are removable retained on the base portion. The power supply supplies electrical power to the high voltage circuit. The high voltage circuit supplies high voltage to the two emitter cartridges. Electrical current arcs from the plurality emitter projections to the plurality of openings.

20 Claims, 6 Drawing Sheets

OZONE GENERATOR WITH A DISPOSABLE EMITTER CARTRIDGE

CROSS-REFERENCES TO RELATED APPLICATIONS

This is a non-provisional patent application, which claims the benefit of provisional application No. 62/061,961 filed on Jun. 25, 2014. Provisional application No. 62/061,961 is hereby incorporated by reference into this application in its entirety.

BACKGROUND OF THE INVENTION

1. Field of the Invention

The present invention relates generally to air purifiers and more specifically to an ozone generator with a disposable emitter cartridge, which does not require the replacement of an entire ozone generator.

2. Discussion of the Prior Art

Ozone generator emitter cartridges fail, because high voltage transmission eventually corrodes emitter projections. However, it appears that the prior art does not teach or suggest an ozone generator with a replaceable emitter cartridge.

Accordingly, there is a clearly felt need in the art for an ozone generator with a disposable emitter cartridge, which does not require the replacement of an entire ozone generator when the emitter cartridge fails.

SUMMARY OF THE INVENTION

The present invention provides an ozone generator with a disposable emitter cartridge, which does not require the replacement of an entire ozone generator. The ozone generator with a disposable emitter cartridge (ozone generator) preferably includes at least one emitter cartridge, a protective housing, a high voltage generation circuit and a power supply. The disposable emitter cartridge preferably includes an anode element, a cathode element and an insulating spacer. The anode element includes a plurality of emitter projections and a contact clip. The contact clip extends from an end of the anode element. The cathode element includes a base plate with a plurality of arc openings formed therethrough. A contact tab extends from the base plate. The anode element is attached to one side of the insulating spacer and the cathode element is attached to an opposing side of the insulating spacer. The insulating spacer includes a first retention projection extending from a first end thereof and a second retention projection extending from a second end thereof.

The protective housing preferably includes a base portion, an emitter housing and at least one vent cap. The high voltage circuit is preferably retained on the base portion. The emitter housing includes an emitter base and at least one emitter tube. The at least one emitter tube extends upward from the emitter base. The vent cap includes a tubular body and a vented tower, which extends from a top of the tubular body. At least two tabs are formed on a bottom and outer perimeter of the tubular body. At least two twist slots are formed in an inner perimeter of the emitter tube to receive the at least two twist slots.

At least one emitter retainer extends upward from a top of the base portion and concentric with the emitter tube. Each emitter retainer includes a first emitter post and a second emitter post. The first emitter post includes a first inward facing slot and the second emitter post includes a second inward facing slot. The first and second inward facing slots are sized to receive the first and second retention projections of the insulating spacer. An anode electrical contact is retained adjacent the first inward facing slot. A cathode electrical contact is retained adjacent the second inward facing slot.

The emitter cartridge is preferably installed in the following manner. The first and second retention projections of the emitter cartridge are pushed into the first and second inward facing slots. A pair of opposed retention walls preferably extend inward from an inner perimeter of the tubular body. The anode contact clip makes electrical contact with the anode electrical contact and the cathode contact tab makes contact with the cathode electrical contact. The pair of opposed retention walls force the anode contact clip and cathode contact tab against the anode and cathode electrical contacts, when the vent caps are twisted into the emitter tubes. The high voltage generation circuit is connected to the anode and cathode electrical contacts. The power supply supplies the high voltage generation circuit with electrical power.

Accordingly, it is an object of the present invention to provide an ozone generator with a disposable emitter cartridge, which does not require the replacement of an entire ozone generator when the emitter cartridge fails.

These and additional objects, advantages, features and benefits of the present invention will become apparent from the following specification.

DETAILED DESCRIPTION OF THE PREFERRED EMBODIMENTS

Figure 1:
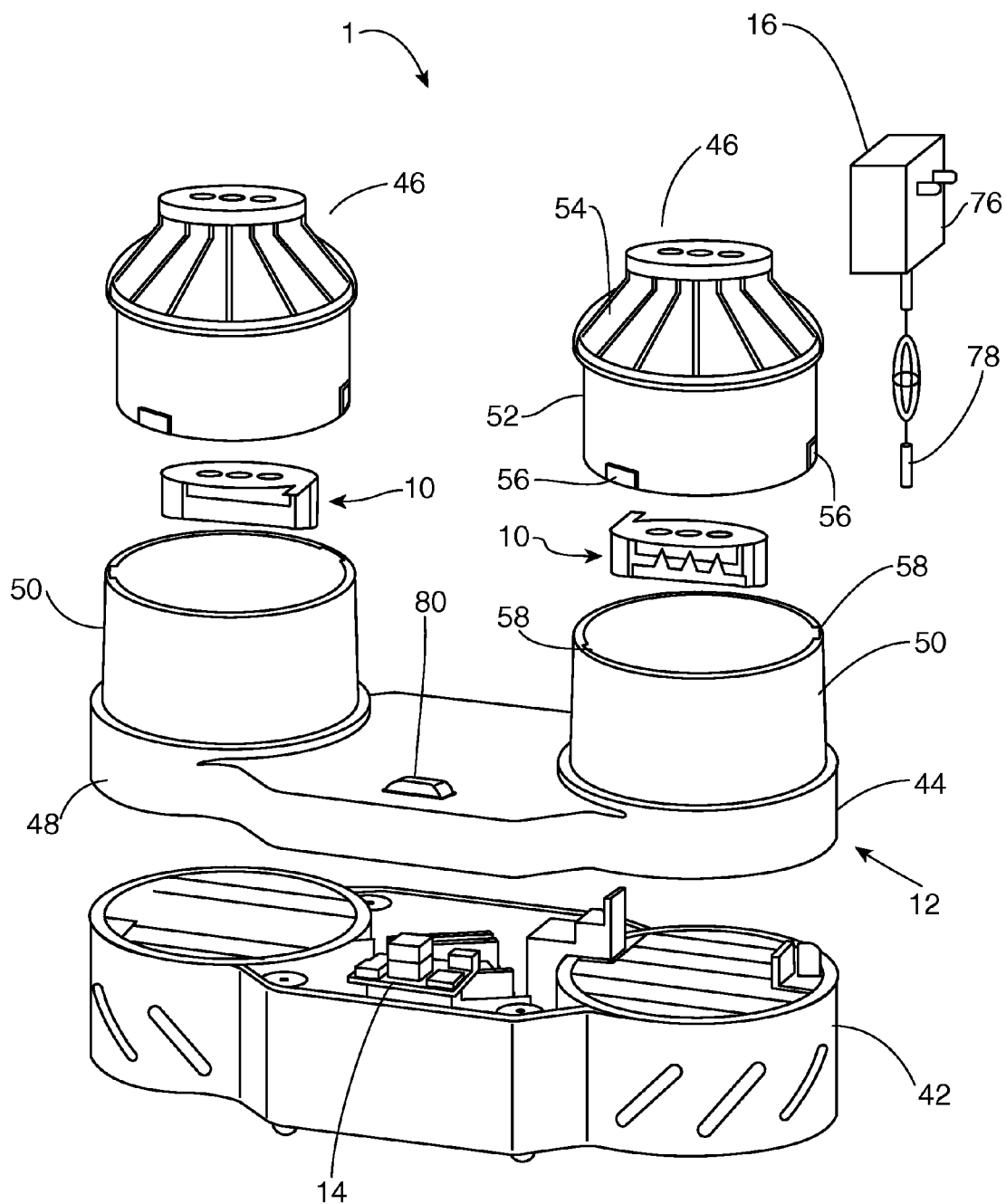
FIG. 1 is an exploded perspective view of an ozone generator in accordance with the present invention.
Figure 2:
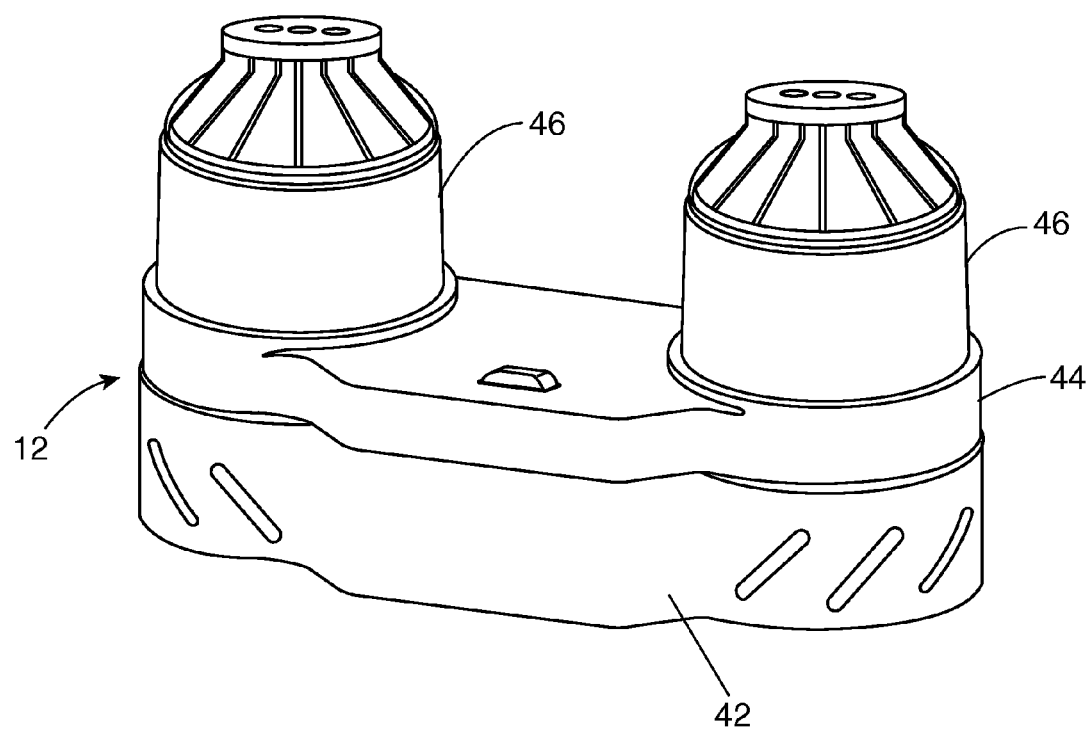
FIG. 2 is a perspective view of an ozone generator in accordance with the present invention.
Figure 6:
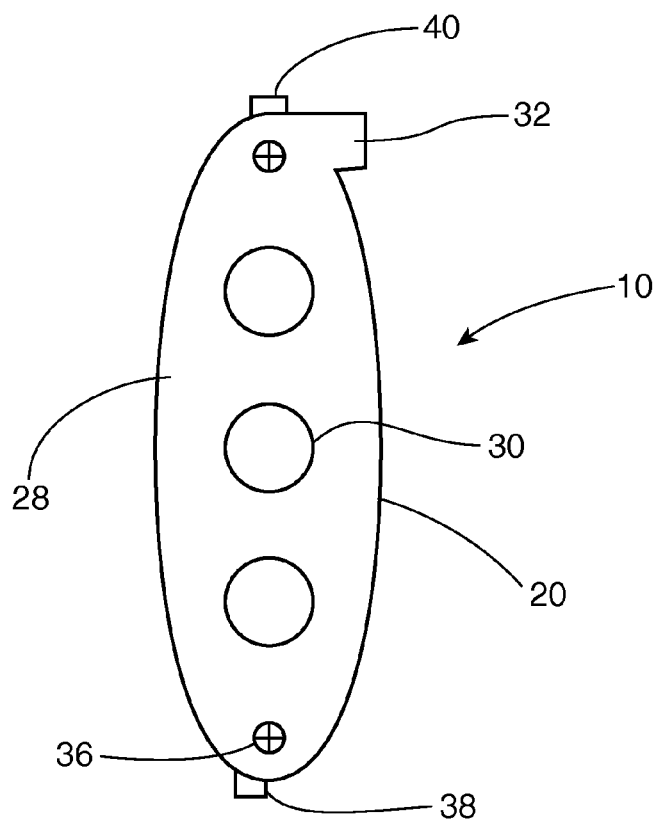
FIG. 6 is a top view of an emitter cartridge of an ozone generator in accordance with the present invention.
Figure 7:
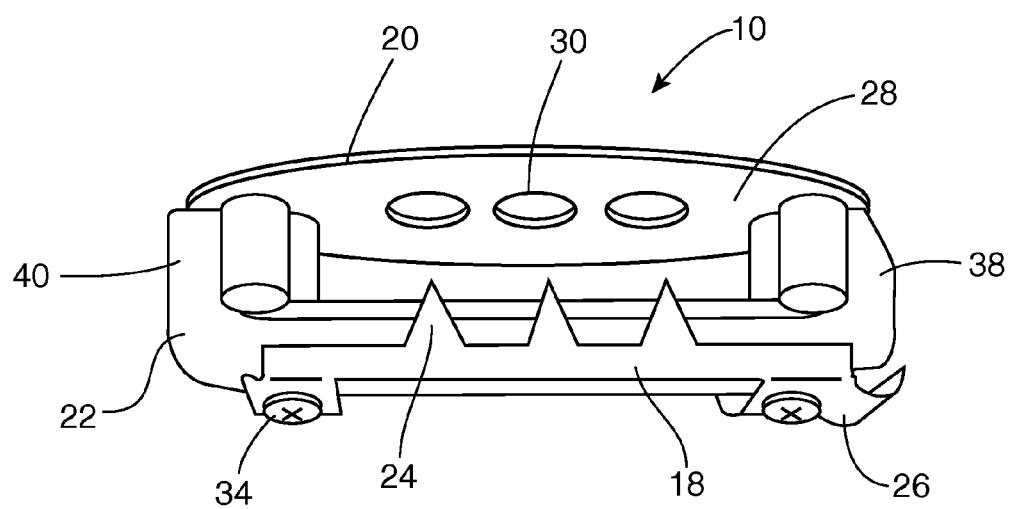
FIG. 7 is a perspective view of an emitter cartridge of an ozone generator in accordance with the present invention.

With reference now to the drawings, and particularly to FIG. 1, there is shown an exploded perspective view of an ozone generator 1. With reference to FIG. 2, the ozone generator 1 preferably includes two emitter cartridges 10, a protective housing 12, a high voltage generation circuit 14 and a power supply 16. With reference to FIGS. 6-7, the disposable emitter cartridge 10 preferably includes an anode element 18, a cathode element 20 and an insulating spacer 22. The anode element 18 includes a plurality of emitter projections 24 and an anode contact clip 26. The anode contact clip 26 extends from an end of the anode element 18. The cathode element 20 includes a base plate 28 with a plurality of arc openings 30 formed therethrough. A cathode contact tab 32 extends from the base plate 28. The anode element 18 is attached to one side of the insulating spacer 22 with two fasteners 34 and the cathode element 20 is attached to an opposing side of the insulating spacer with two fasteners 36. The insulating spacer 22 includes a first retention projection 38 extending from a first end thereof and a second retention projection 40 extending from a second end thereof.

The protective housing 12 preferably includes a base portion 42, an emitter housing 44 and a pair of vent caps 46. The high voltage circuit 14 is preferably retained on the base portion 42. The emitter housing 44 includes an emitter base 48 and a pair of emitter tubes 50. The pair of emitter tubes 50 extend upward from each end of the emitter base 48. Each vent cap 46 includes a tubular body 52 and a vented tower 54, which extends from a top of the tubular body 52. At least two tabs 56 are formed on a bottom and outer perimeter of the tubular body 52. At least two twist slots 58 are formed in an inner perimeter of each emitter tube 50 to receive the at least two tabs 56.

Figure 3:
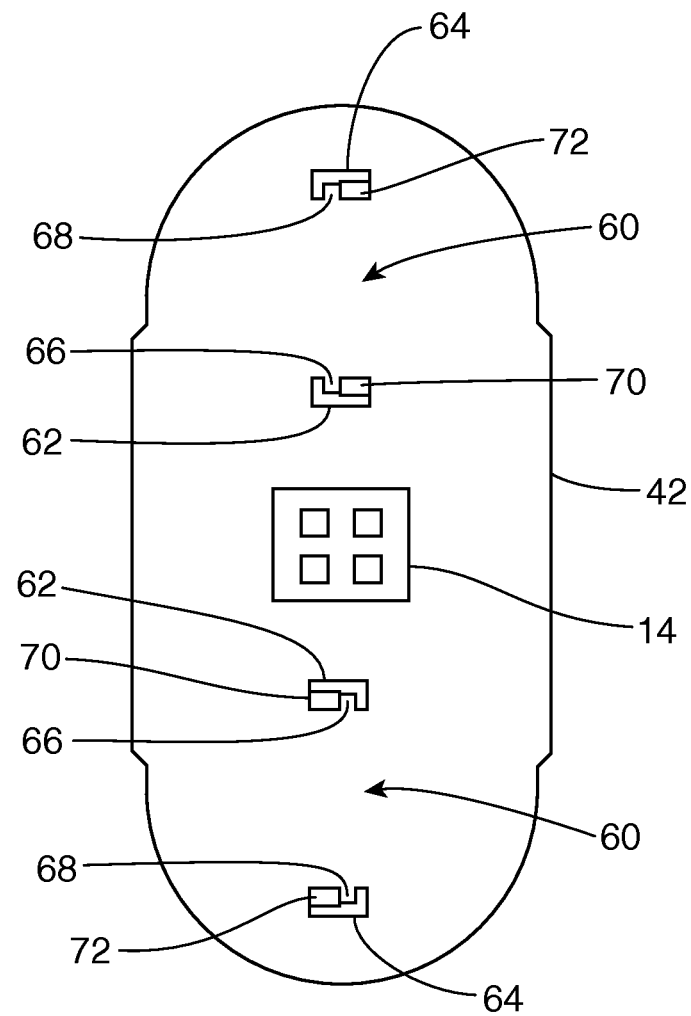
FIG. 3 is a top view of a base portion of a protective housing of an ozone generator in accordance with the present invention.
Figure 4:
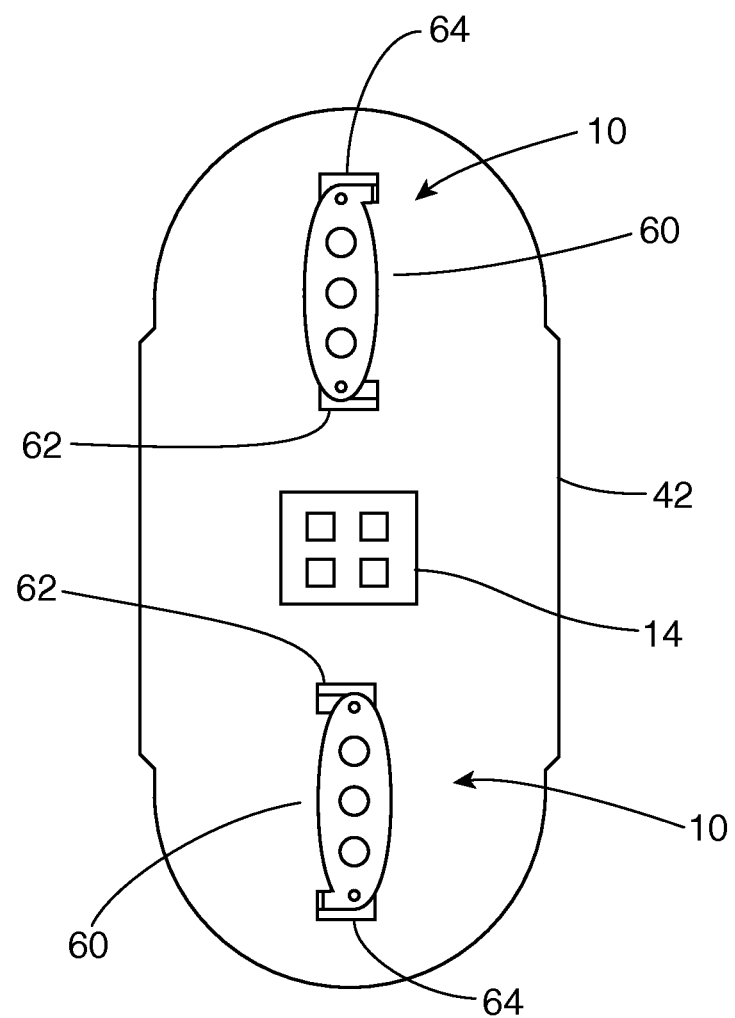
FIG. 4 is a top view of a base portion of a protective housing with two emitter cartridges retained therein of an ozone generator in accordance with the present invention.
Figure 5:
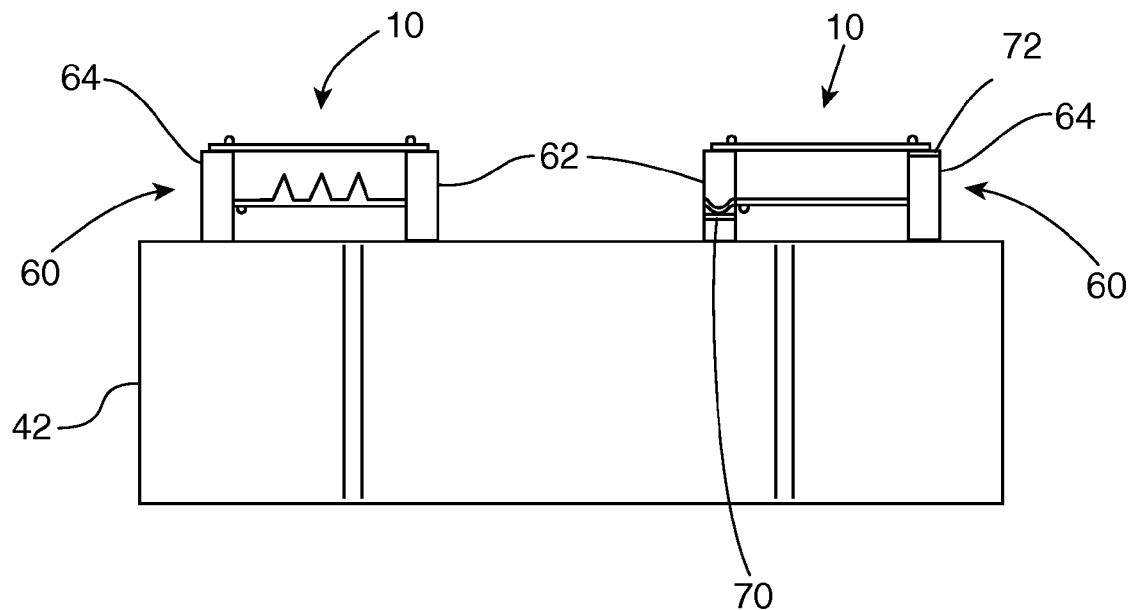
FIG. 5 is a side view of a base portion of a protective housing with two emitter cartridges retained therein of an ozone generator in accordance with the present invention.
Figure 8:
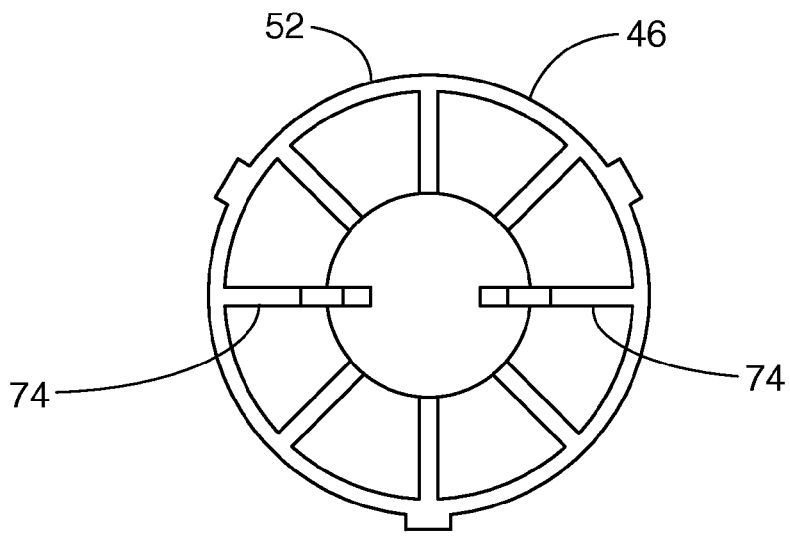
FIG. 8 is a bottom view of a vent cap of an ozone generator illustrating a pair of opposed retention walls in accordance with the present invention.

With reference to FIGS. 3-5, a pair of emitter retainers 60 extend upward from a top of the base portion 42 and concentric with each emitter tube 50. Each emitter retainer 60 includes a first emitter post 62 and a second emitter post 64. The first emitter post 62 includes a first inward facing slot 66 and the second emitter post 64 includes a second inward facing slot 68. The first and second inward facing slots 66, 68 are sized to receive the first and second retention projections 38, 40 of the insulating spacer 22. An anode electrical contact 70 is retained adjacent the first inward facing slot 66. A cathode electrical contact 72 is retained adjacent the second inward facing slot 68. The emitter cartridge 10 is preferably installed in the following manner. The first and second retention projections 38, 40 of the emitter cartridge 10 are pushed into the first and second inward facing slots 66, 68. A pair of opposed retention walls 74 preferably extend inward from an inner perimeter of the tubular body 52. The anode contact clip 26 makes electrical contact with the anode electrical contact 70 and the cathode contact tab 32 makes contact with the cathode electrical contact 72. The pair of opposed retention walls 74 force the anode contact clip 26 and cathode contact tab 32 against the anode and cathode electrical contacts 70, 72, when the vent caps 46 are twisted into the emitter tubes 50. The high voltage generation circuit 14 is connected to the anode and cathode electrical contacts 70, 72. The power supply 16 includes electrical prongs 76 and a DC plug 78. The electrical prongs 76 are plugged into an AC outlet and the DC plug 78 is inserted into a female input supply of the high voltage circuit 14. An on-off switch 80 is then toggled to supply electrical power to the pair of emitter cartridges 10. During operation, electrical current flows from said plurality of emitter projections 24 to said plurality of arc openings 30.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. An ozone generator with a disposable emitter cartridge comprising:
   at least one emitter cartridge includes an anode element, a cathode element and an insulating spacer, said anode element includes a plurality of emitter projections;
   a base portion includes at least one emitter retainer, one of said at least one emitter cartridge is removably retained in one of said at least one emitter retainer; and
   a device for removably retaining said emitter cartridge in said emitter retainer.

2. The ozone generator with a disposable emitter cartridge of claim 1, further comprising:
   a high voltage generation circuit is connected to said at least one emitter cartridge.

3. The ozone generator with a disposable emitter cartridge of claim 2, further comprising:
   a voltage supply is connected to said high voltage generation circuit, said voltage supply provides electrical power to said high voltage generation circuit.

4. The ozone generator with a disposable emitter cartridge of claim 1 wherein:
   said anode element includes a contact clip extending from an end thereof, said cathode element includes a contact tab extending from an end thereof.

5. The ozone generator with a disposable emitter cartridge of claim 1, further comprising:
   said emitter cartridge is retained in a tube.

6. An ozone generator with a disposable emitter cartridge comprising:
   at least one emitter cartridge includes an anode element, a cathode element and an insulating spacer, said anode element includes a plurality of emitter projections;
   a base portion includes at least one emitter retainer, one of said at least one emitter retainer includes a first emitter post and a second emitter post, a first end of said emitter cartridge is retained in said first emitter post, a second end of said emitter cartridge is retained in said second emitter post; and
   a device for removably retaining said emitter cartridge in said emitter retainer.

7. The ozone generator with a disposable emitter cartridge of claim 6 wherein:
   said insulating spacer includes a first retention projection extending from a first end thereof and a second retention projection extending from a second end thereof.

8. The ozone generator with a disposable emitter cartridge of claim 7 wherein:
   said first emitter post includes a first inward facing slot, said second emitter post includes a second inward facing slot, wherein said first and second inward facing slots are sized to receive said first and second retention projections.

9. The ozone generator with a disposable emitter cartridge of claim 8 wherein:
   said anode element includes a contact clip extending from an end thereof, said cathode element includes a contact tab extending from an end thereof.

10. The ozone generator with a disposable emitter cartridge of claim 9 wherein:
    an anode electrical contact is retained adjacent said first inward facing slot, a cathode electrical contact is retained adjacent said second inward facing slot, wherein said contact clip makes electrical contact with said anode electrical contact, said contact tab make electrical contact with said cathode electrical contact.

11. The ozone generator with a disposable emitter cartridge of claim 6, further comprising:
    a high voltage generation circuit is connected to said at least one emitter cartridge.

12. The ozone generator with a disposable emitter cartridge of claim 11, further comprising:
    a voltage supply is connected to said high voltage generation circuit, said voltage supply provides electrical power to said high voltage generation circuit.

13. An ozone generator with a disposable emitter cartridge comprising:

at least one emitter cartridge includes an anode element, a cathode element and an insulating spacer, said anode element includes a plurality of emitter projections, said cathode element includes a plurality of openings, wherein electrical current flows from said plurality of emitter projections to said plurality of openings;

a base portion includes at least one emitter retainer, one of said at least one emitter retainer includes a first emitter post and a second emitter post, a first end of said emitter cartridge is retained in said first emitter post, a second end of said emitter cartridge is retained in said second emitter post; and a device for removably retaining said emitter cartridge in said emitter retainer.

14. The ozone generator with a disposable emitter cartridge of claim 13 wherein:

said insulating spacer includes a first retention projection extending from a first end thereof and a second retention projection extending from a second end thereof.

15. The ozone generator with a disposable emitter cartridge of claim 14 wherein:

said first emitter post includes a first inward facing slot, said second emitter post includes a second inward facing slot, wherein said first and second inward facing slots are sized to receive said first and second retention projections.

16. The ozone generator with a disposable emitter cartridge of claim 15 wherein:

said anode element includes a contact clip extending from an end thereof, said cathode element includes a contact tab extending from an end thereof.

17. The ozone generator with a disposable emitter cartridge of claim 16 wherein:

an anode electrical contact is retained adjacent said first inward facing slot, a cathode electrical contact is retained adjacent said second inward facing slot, wherein said contact clip makes electrical contact with said anode electrical contact, said contact tab make electrical contact with said cathode electrical contact.

18. The ozone generator with a disposable emitter cartridge of claim 13, further comprising:

a high voltage generation circuit is connected to said at least one emitter cartridge.

19. The ozone generator with a disposable emitter cartridge of claim 18, further comprising:

a voltage supply is connected to said high voltage generation circuit, said voltage supply provides electrical power to said high voltage generation circuit.

20. The ozone generator with a disposable emitter cartridge of claim 13, further comprising:

a protective housing includes said base portion, an emitter housing and at least one vent cap, said emitter housing includes at least one emitter tube, said emitter tube is sized to receive said vent cap.

* * * * *